Aug. 9, 1938.   H. R. TEAR   2,126,424
LUBRICATING DEVICE
Filed May 1, 1937

INVENTOR.
HARRY R. TEAR
BY McConkey & Booth
ATTORNEYS.

Patented Aug. 9, 1938

2,126,424

UNITED STATES PATENT OFFICE 2,126,424

LUBRICATING DEVICE

Harry R. Tear, Evanston, Ill., assignor to The Lubrication Corporation, Chicago, Ill., a corporation of Delaware Application May 1, 1937, Serial No. 140,077

5 Claims. (Cl. 221—47.3)

This invention relates to cartridges for lubricant or the like and more particularly to factory filled cartridges or containers adapted to be attached to suitable devices for dispensing their contents.

In cartridges of this type it is necessary to provide an outlet opening suitably shaped to seal against a receiving member and it is one of the objects of the present invention to provide a simple, inexpensive construction in which a suitable sealing surface is provided.

According to an important feature of the invention the head is so formed as to provide a smooth inner surface in the cartridge in which no pockets are formed wherein air might be trapped during filling. The sealing surface is provided by a separate annular member secured to the head around the outlet opening and shaped to seal against a receiving member.

Other objects, advantages and novel features of the invention will be apparent from the following description when read in connection with the accompanying drawing, in which.

Figure 1:
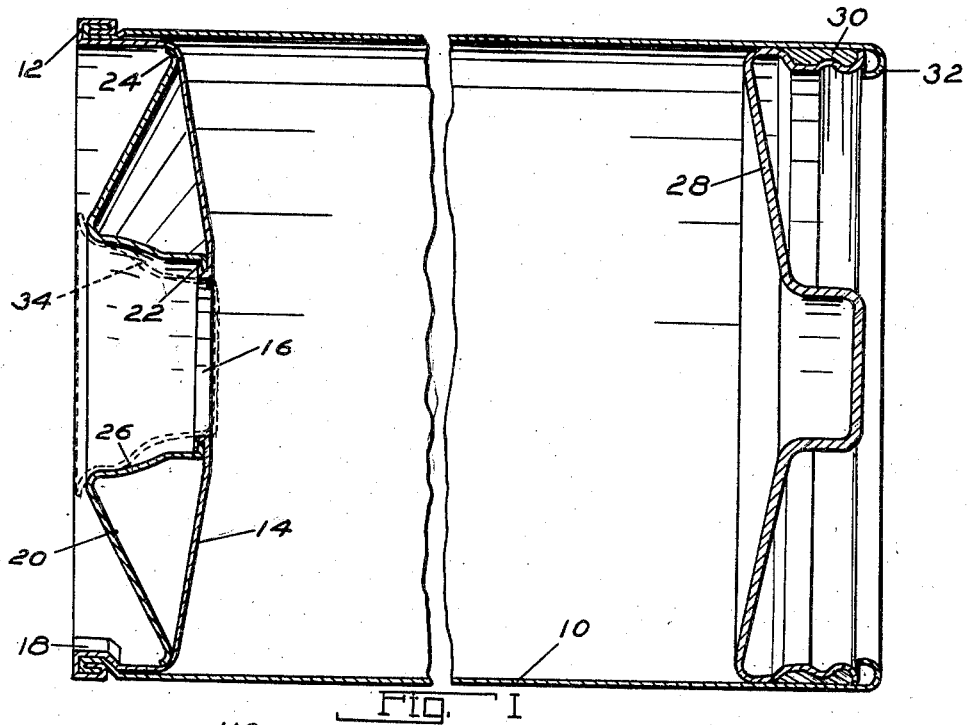
Figure 1 is an axial section of a cartridge embodying the invention.

The cartridge of Figure 1 comprises a cylindrical sheet metal body 10 formed with a soldered lap seam 11 and having permanently secured at one end, as by a conventional crimp seam 12, a sheet metal head 14 formed with a central outlet opening 16. As shown, the head 14 is dished inwardly slightly to increase its strength but it will be apparent that it could be made flat or dished outwardly if desired.

The cartridge is adapted to be secured to a dispensing device, for example of the type shown in the patent to Dodge No. 1,987,002 and for this purpose the forward edge is pressed in at a plurality of points to form attaching lugs 18 to cooperate with a connector plate on the dispensing device.

In order to provide a fluid tight seal with a receiving member or stud on the dispenser, an annular sheet metal member 20 generally V-shaped in cross-section is secured to the outside of the head. The member 20 may be secured by turning a flange 22 at the edge of the outlet opening over a bead at one edge of the member 20, the other edge of member 20 lying against the head as shown at 24. It will be noted that the head 14 is offset inwardly so that the outermost part of the member 20 lies within the confines of the body 10 so it is protected and that the edge 24 of the member 20 engages the head 14 substantially at its periphery, thereby providing a very rigid structure.

As shown, the member 20 is formed with a generally concave spherical surface 26 for sealing engagement with a spherical inlet stud on the dispenser. However, it will be understood that this surface could have any desired shape conforming to the shape of the stud.

The opposite end of the cartridge body is closed by a piston 28 slidably fitting in the body and carrying a packing 30 wiping against the body as the piston is moved. The piston is prevented from falling out of the body by a bead 32 rolled on the body end. During shipment or storage the outlet opening 16 may be closed by a plug 34 shaped to seal against the spherical surface 26.

Figures 2, 3:
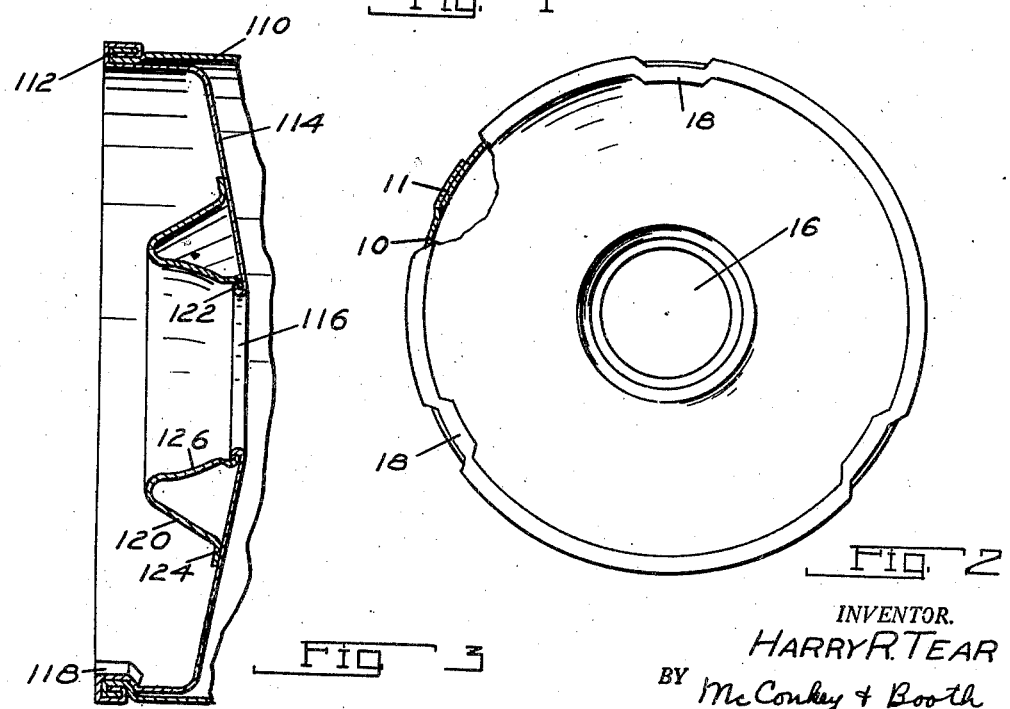
Figure 2 is an end view of Figure 1 with parts in section.
Figure 3 is a partial view similar to Figure 1 showing a modified construction.

Figure 3 shows a modified form of cartridge, parts therein corresponding to like parts in Figure 1 being indicated by the same reference numerals plus 100. The principal difference between this form and that shown in Figure 1 is that the annular member 120 is of less width so that its edge 124 engages the head 114 much closer to the opening 116. This provides a slightly less rigid construction than that of Figure 1 but is somewhat less expensive.

While two embodiments of the invention have been shown and described it will be understood that various changes might be made therein and it is not intended to limit the scope of the invention to the forms shown nor otherwise than by the terms of the appended claims.

What is claimed is:

1. A cartridge for lubricant or the like comprising a hollow body portion, a head member secured to one end of the body portion and formed with an outlet opening, and an annular member substantially V-shaped in cross-section secured to the outer surface of said head member around the edge of the outlet opening and having a surface formed for sealing engagement with a receiving member.

2. A cartridge for lubricant or the like comprising a hollow body portion, a head member secured to one end of the body portion and formed with an outlet opening, and an annular member secured to said head member around the edge of said outlet opening and having a portion engaging the head member remote from the opening, said annular member having a surface formed for sealing engagement with a receiving member.

3. A cartridge for lubricant or the like comprising a cylindrical sheet metal body, a sheet metal head secured to one end of the body and formed with a central outlet opening, and an annular sheet metal member secured to the head around the outlet opening and having an edge sealingly engaging the head at the edge of the outlet opening and formed with a concave surface for sealingly engaging a receiving member.

4. A cartridge for lubricant or the like comprising a cylindrical sheet metal body, a sheet metal head secured to one end of the body and formed with a central outlet opening, an annular sheet metal member secured to the head around the outlet opening and having an edge sealingly engaging the head at the edge of the outlet opening and formed with a concave surface for sealingly engaging a receiving member and a piston slidably mounted in said body and forming a movable closure for the other end thereof.

5. A cartridge for lubricant or the like comprising a cylindrical sheet metal body, a sheet metal head secured to one end of the body and formed with a central outlet opening, and a sheet metal member substantially V-shaped in cross section with one edge secured to the head around the outlet opening and its other edge engaging the head remote from the outlet opening, said member being formed with a concave surface around the outlet opening for sealing engagement with a receiving member.

HARRY R. TEAR.